United States Patent [19]

Kopernicky

[11] Patent Number: 4,636,084

[45] Date of Patent: Jan. 13, 1987

[54] REMOVING VOLATILES FROM PLASTIC MATERIALS DELIVERED TO AN EXTRUSION OR INJECTION MOLDING MACHINE

[75] Inventor: Jaro Kopernicky, Bramalea, Canada

[73] Assignee: Mapro Inc., Georgetown, Canada

[21] Appl. No.: 358,554

[22] Filed: Mar. 16, 1982

[51] Int. Cl.⁴ .............................................. B28C 7/04
[52] U.S. Cl. .................................. 366/76; 264/40.1; 264/101; 264/102; 366/79; 366/139
[58] Field of Search ............... 264/101, 102, 328.14, 264/40.1; 366/76, 79, 139

[56] References Cited

U.S. PATENT DOCUMENTS

| | | |
|---|---|---|
| 759,527 | 5/1904 | Irwin . |
| 3,163,888 | 1/1965 | Shattuck .................. 264/328.14 |
| 3,335,462 | 8/1967 | Grigull et al. .................. 264/102 |
| 3,563,514 | 2/1971 | Shattuck .................. 425/205 |
| 3,655,313 | 4/1972 | Kunogi .................. 425/130 |
| 3,826,477 | 7/1974 | Kunogi et al. .................. 425/208 |
| 4,191,726 | 3/1980 | Stillhard .................. 264/328.14 |

OTHER PUBLICATIONS

Meiki Co., Ltd. brochure entitled, "M-Series Injection Molding Machine", No. C-320B 83. 8. 700A.
Plastics Technology, Preheating Thermoplastic Materials, Leiske, Roy R., In India Rubber World, Nov. 1947, p. 227.

*Primary Examiner*—James Derrington
*Attorney, Agent, or Firm*—Riches, McKenzie & Herbert

[57] ABSTRACT

A device is described which eliminates the pre-drying of particulate plastic prior to processing by an extrusion or injection molding machine. A tubular guide member directs particulate plastic under gravity into the feed inlet of the machine. During delivery, the temperature of the particulate plastic is raised with heated air flows to between about 150°–200° F. Suction is applied to the feed inlet of the machine to remove volatiles (primarily water) released when the temperature of the particulate plastic is increased by contact with the heated barrel and screw-drive of a machine. Temperature and suction controls permit selection of operating temperature and suction levels that ensure removal of volatiles prior to any extensive plasticization and transfer along the barrel which would otherwise preclude proper removal of volatiles.

7 Claims, 3 Drawing Figures

REMOVING VOLATILES FROM PLASTIC MATERIALS DELIVERED TO AN EXTRUSION OR INJECTION MOLDING MACHINE

FIELD OF THE INVENTION

The invention relates to the delivery and pre-processing of particulate plastic materials (primarily in pellet form) which are to be plasticized in a machine of the injection-molding or extrusion type, and to the elimination of volatiles (primarily moisture) contained in such materials.

BACKGROUND OF THE INVENTION

A major problem encountered in injection-molding plastic materials involves removal of moisture and other volatiles contained in these materials, prior to injection into a mold. Failure to adequately remove moisture from the materials tends to produce air pockets in the resultant product and to seriously degrade the quality of the product. It is consequently a common practice to dry such materials in a reservoir through which a flow of heated air is passed. Several hours of drying are usually required, and a considerable amount of energy is expended during the drying process. To conserve energy, warm, damp air exhausted from the reservoir is sometimes circulated through a dessicant filter, re-heated and then re-circulated through the reservoir. The filters must periodically be purged of water, and elaborate systems have been proposed for removing filters between an operative, in-line position and purging apparatus, without significantly interrupting the drying process.

Another method of removing moisture prior to actual injection involves venting the barrel of the molding machine. A problem faced in venting the barrel is the possibility that internal pressure will force plasticized materials into the vent. An injection molding machine adapted for barrel venting is described in U.S. Pat. No. 3,826,477 which issued on July 30, 1974 citing Mahito Kunoti et al as inventors. The Kunoti patent describes an injection molding machine in which the barrel is formed with sections of stepped internal diameter, and in which the screw thread is adapted to reduce the accumulation of plasticized materials in a particular region of relatively wider diameter. The vent is then introduced into this region where pressure is significantly reduced to permit the venting of volatiles without significant expulsion of plasticized material into the vent. Prior techniques of venting a stepped barrel have not been entirely successful, and in some instances a measure of pre-drying has been felt necessary to obtain a molded product of satisfactory quality.

The invention provides a device and associated method for introducing particulate plastic materials into a machine of the injection-molding or extrusion type which completely eliminates the need for pre-drying and which removes moisture and other volatiles in a simple, yet effective manner that does not require modification of an existing machine or construction of a machine with a stepped barrel or complex screw-drive.

BRIEF SUMMARY OF THE INVENTION

In a first aspect, the invention provides a method of feeding particulate plastic material to the material inlet of a machine of the injection-molding or extrusion type in which a heated barrel and screw-drive are used to plasticize plastic materials. The method involves heating the particulate plastic material to a temperature lying in a predetermined temperature range, and delivering the heated materials to the material inlet of the machine. Suction is applied at the material inlet to remove volatiles produced by contact of the heated materials with the heated barrel and screw-drive of the machine.

In a second aspect, the invention provides a device for use in feeding particulate plastic materials to the material inlet of the machine. The device includes guide means which direct movement of particulate plastic material to the material inlet of the machine and which include an inlet for receiving the particulate plastic material and an outlet adapted to be placed in communication with the material inlet of the machine. Heating means can be actuated to heat the particulate plastic material as the material moves between the inlet and outlet of the guide means. Venting means adapted to be connected to a source of suction serve to apply suction at the material inlet to remove volatiles produced by contact of the particulate plastic material with a heated barrel and screw-drive of the machine.

BRIEF DESCRIPTION OF THE DRAWINGS

The invention will be better understood with reference to drawings which illustrate a preferred embodiment of a device constructed according to the invention, in which.

DESCRIPTION OF THE PREFERRED EMBODIMENT

Figure 1:
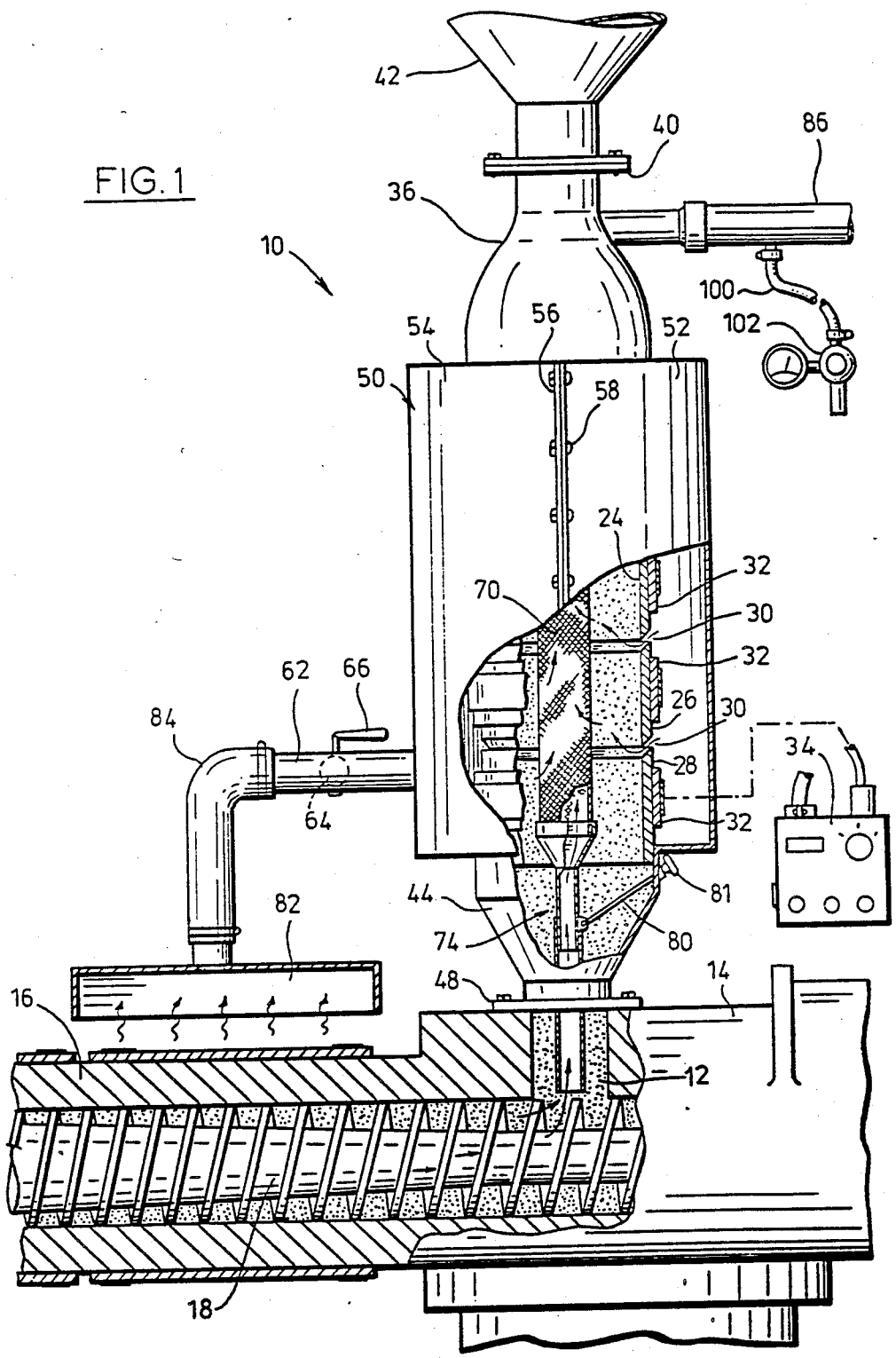
FIG. 1 is a fragmented, elevational view illustrating the device mounted on an injection molding machine.
Figure 2:
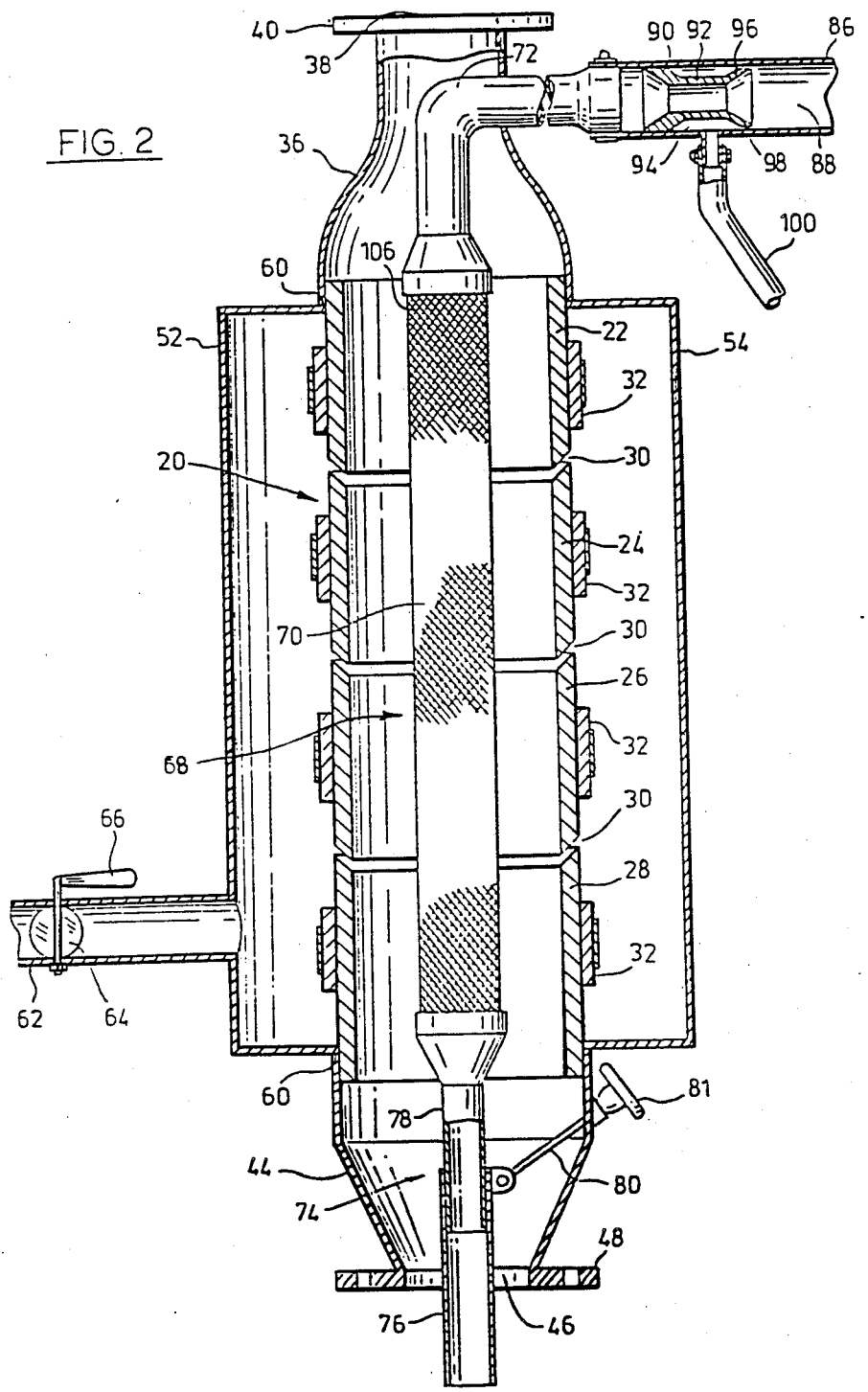
FIG. 2 is a cross-sectional view of the device in FIG. 1 parallel to the plane of FIG. 1 and substantially down the centre of the device; and, FIG. 3 is a fragmented, elevational view illustrating the device adapted for self-feeding from a reservoir of particulate plastic material.

Reference is made to FIG. 1 which illustrates a device embodying the invention and generally indicated by the reference numeral 10. The device 10 is seated about the material inlet 12 of an injection molding machine 14. The machine 14 is of the type having a heated barrel 16 and screw-drive 18 which are used to plasticize particulate plastic materials.

The device 10 includes means adapted to guide particulate plastic materials under the influence of gravity to the material inlet 12 of the machine 14. The guide means include a tubular guide member 20 constructed in four steel rings 22, 24, 26, 28 about 4 inches in diameter and ¼ inch in thickness. The rings are spaced vertically to provide apertures 30 which are generally annular except for weld points which are not illustrated in the drawings. The apertures 30 are angled upwardly at about 45° to the interior surface of the tubular guide member 20 to permit the passage of air but preclude the escape of particulate materials (because of the natural angle of repose of the latter). An annular heating band 32 is secured with a strap connector to the outer surface of each of the rings. The heating bands 32 are coupled to a temperature controller 34 which can be used to vary the power supplied to the heating bands 32, and have together a maximum heat generating capacity of about 400 watts.

The guide means include a bell-shaped housing 36 which is snuggly fit about and bolted to the upper ring 22. An opening 38 circumscribed by an apertured abutment flange 40 serves as an inlet for the guide means. A hopper 42 (fragmented) is bolted to the abuttment flange 40, and serves as a reservoir for materials to be delivered by the device 10. A second bell-shaped housing 44 is fitted in a similar manner about the lower ring 28, and has an opening 46 which serves as an outlet for the guide means and which is circumscribed by an apertured abuttment flange 48 that is bolted to the machine 14 to place the opening 46 in communication with the material inlet 12.

Means are provided to direct a heated air flow through materials guided in the tubular guide member 20. These means include a cylindrical, sheet metal housing 50. The housing 50 is constructed in two halves 52, 54 formed with longitudinal flanges 56 (only one pair illustrated) adapted to be secured to one another by means of bolts 58 (only one specifically indicated). The housing 50 is dimensioned to fit snuggly between annular surfaces 60 of the bell-shaped housings 36, 44. The housing 50 defines a compartment about the tubular member 20 and heating bands 32, which is substantially sealed: leakage of air is not particularly critical as the general object is to contain heat radiated from the bands 32. The housing half 52 has an inlet pipe 62 for receiving air to be heated by the bands 32. A damper 64 with a control arm 66 is pivotally mounted in the inlet pipe 62 for regulating the intake of air.

Means are provided for drawing heated air flows into the tubular guide member 20. These means include a conduit 68 centrally located in the tubular member 20. The conduit 68 includes a length of meshed pipe 70 with apertures that permit passage of air but preclude the entry of plastic pellets typically used in injection molding or extrusion. The conduit 68 includes an elbow 70 which extends through a sidewall of the bell-shaped housing 36 and is sealed to the housing 36 by welding, and which can be coupled to a source of suction. At a lower end, the conduit 68 is integrally formed with an extension conduit 74 which extends into the material inlet 12 of the machine 14 to direct suction for removal of volatiles. The extension conduit 74 is constructed as a telescoping member with an outer tube 76 slidably mounted over an inner tube 78. A simple lock assembly is provided to prevent telescoping of the outer tube 76 into contact with the screw-drive 18. The lock assembly comprises a rod 80 hinged to the outer tube 76 and extending through an aperture in the bell-shaped housing 44. A knob 81 secured to an end of the rod 80 prevents the outer tube 76 from telescoping beyond a predetermined position.

A heat deflecting housing 82 (extensively fragmented in the view of FIG. 1) is mounted about the barrel 16 of the machine 14 to gather heat radiated by the barrel 16 during operation. The housing 82 is coupled by a flexible conduit 84 to the inlet pipe 62 of the housing 50. This arrangement provides means for pre-heating air to be heated by the bands 32, and in typical applications may have a temperature in the order of about 120°–130° F. This arrangement significantly reduces the power requirement placed on the heater bands 32.

An exhaust pipe 86 of about 2 inch diameter is strapped to the elbow 72. A substantially radially symmetric, metal insert 88 provides a nozzle for directing pressured air flows. The insert 88 has a first annular portion 90 which contacts the interior surface of the exhaust pipe 86 in substantially conforming engagement, a second annular portion 92 which is spaced from the interior surface of the exhaust pipe 86 to define an annular space 94, and a third annular portion 96 with an annular surface 98 marginally spaced from the interior surface of the exhaust pipe 86 to define an annular nozzle. An air hose 100 is secured to the exhaust pipe 86, and is in pressure communication with the annular space 98. Compressed air pressurizes the annular space 96 causing a stream of air to flow about the surface 98 into the exhaust pipe 86. The pressure applied can be varied by a regulator 102 and in typical applications 3–5 pounds of pressure are applied to the hose 100. This generates sufficient suction in the conduit 86 both to draw heated air flows and to exhaust volatiles at the material inlet 16 of the machine 14 (as well as permitting a material delivery function described more fully below). A nozzle of simpler construction (for example a right-angled tube) can be used, but the insert 88 is relatively simple to install and cannot be rotated by vibration or the like into a position in which air flows would be mis-directed.

Operation of the device 10 in combination with the machine 14 proceeds essentially as follows. Particulate plastic material 104 is gravity fed from the hopper 42 into the tubular guide member 20 and ultimately into the material inlet 12 of the machine 14. The delivery rate is determined entirely by the take-up rate of the machine 14. During start-up, materials loaded into the tubular guide member 20 should be heated for about 5–10 minutes with heated air flows prior to starting operation of the machine 14. The machine 14 should then be purged with several shots. Resulting sample products should be inspected visually for defects such as lines or bubbles characteristic of unvented volatiles. If a new plastic material is being introduced into the machine 14, the heat delivered by the bands 32 should be increased until a satisfactory product is obtained substantially free of any deleterious qualities. In practice, the temperature to which particulate plastic materials are to be heated is not unduly critical: heating to temperatures in the range of 150°–200° F. is satisfactory for most plastic materials, and exceeding some predetermined minimum temperature at which a satisfactory product can be obtained has not in testing adversely affected the resultant product. The setting of the pressure in the air hose 100 is also not particularly critical and the pressure must simply exceed some empirically determined minimum value at which volatiles are sufficiently removed from the material inlet 12 that a satisfactory product is obtained. In practice, a pressure setting satisfactory for one type of material will generally be satisfactory for another; however, a case may arise where both temperature and pressure must be adjusted to obtain a satisfactory product when a new material is being plasticized. Typical feed rates which can be achieved using the device 10 are as follows: typical nylon materials at 100 pounds per hour, ABS products at 120 pounds per hour, and polycarbonates at 70 pounds per hour. Heat settings for the bands 32 may have to varied if plastic materials are stored or plasticized in a particulary humid environment. Increased feed rates can be obtained by constructing the guide member 20 with additional aligned rings, or by an overall increase in the dimensions of the device 10 (the housing 50 being about 10 inches in diameter, and the distance between the inlet and outlet of the device 10 being about 28 inches).

The term "heating" as used in this specification should be distinguished from "pre-drying". The principle of operation of the device 10, and the method which it embodies, is to heat particulate plastic materials to such a temperature that contact with the barrel and screw-drive of the plasticizing machine adjacent the material inlet of the machine (prior to an extensive plasticization and transfer by the screw-drive) causes liberation of volatiles contained in the plastics. Suction applied at the material inlet of the machine can in such circumstances suffice to remove substantially all volatiles which would produce any noticable effect in the product produced by the machine.

Figure 3:
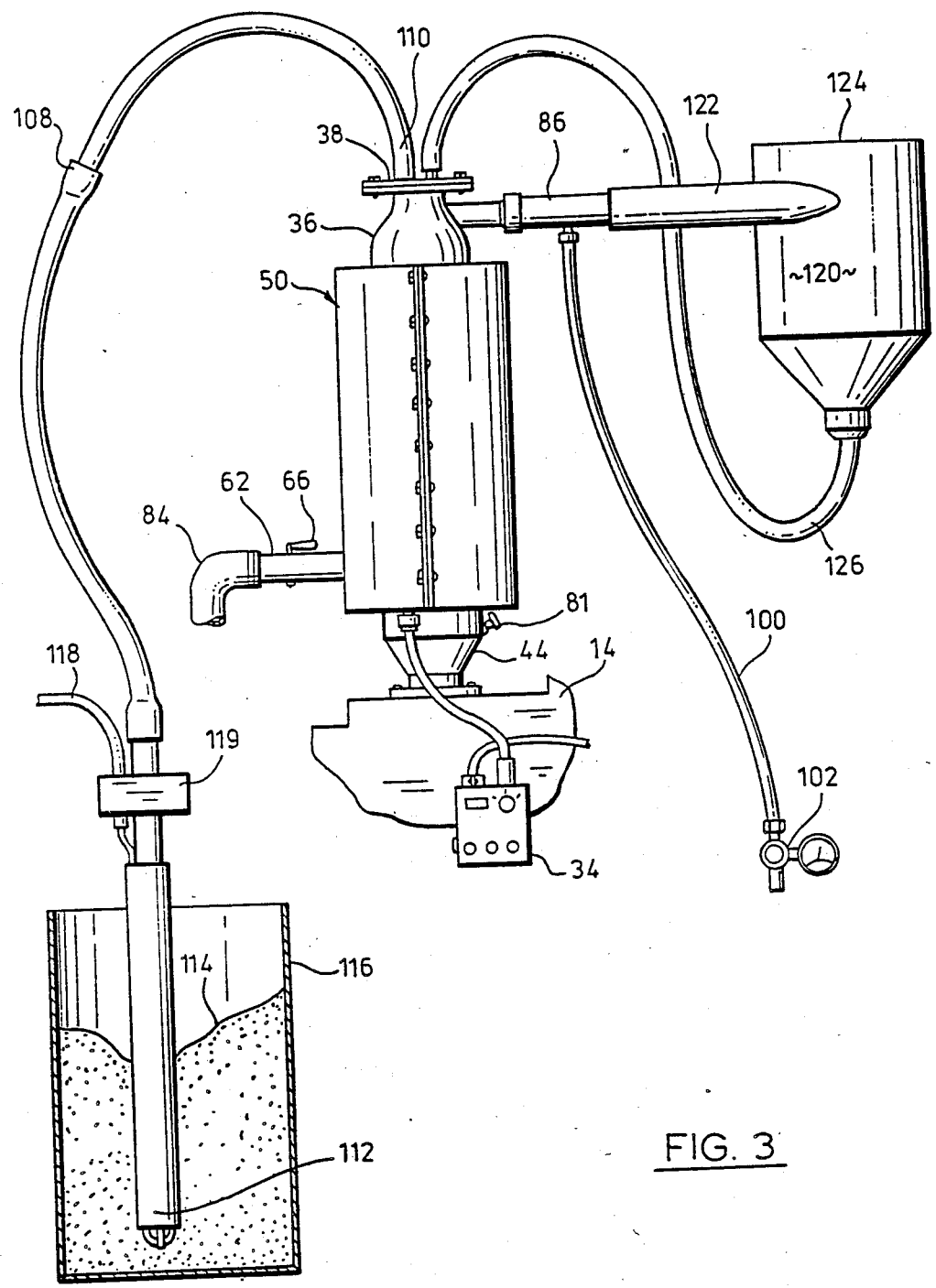

FIG. 3 shows the device 10 adapted to be self-feeding in a regulated fashion. In this respect, it should be appreciated that the bell-shaped housing 36 effectively defines a substantially sealed compartment about the inlet opening 38 and about an apertured portion 106 of the conduit 68. Thus, when particulate plastic materials cover the apertures 30 suction applied to the interior of the conduit 68 produces a negative pressure region in the bell-shaped housing 44 at the inlet opening 38. The material supply conduit 108 has an upper end portion 110 in pressure communication with the inlet opening 38 (the hopper 42 having been removed) and a lower end portion 112 inserted into a mass of particulate plastic material (pelletized) 114 contained in a reservoir 116 (shown fragmented). A tube 118 connected to a source of compressed air directs a flow of air upwardly in the material supply conduit 108, thereby producing a negative pressure in the conduit 108 that tends to draw the material 114 into the conduit 108. The pressure applied to the tube 118 is regulated so that material 114 is not drawn up the conduit 108 until additional negative pressure is created within the bell-shaped housing 36 by suction applied to the conduit 68. Consequently, material 114 is drawn into the device 10 only until the apertures of the conduit portion 116 are covered with the material 114. The rate of take-up of material 114 through the conduit 108 is thus constrained to correspond to the rate at which material is consumed by the machine 14. A vibrator 119 in pressure communication with the tube 118 and operated by pressure in the tube 118 vibrates the conduit 108 thereby agitating the material 114 in the reservoir 116 to prevent bare spots from forming about the lower end portion 118 of the conduit 108.

A second reservoir 120 which is a cyclone type separator communicates with the exhaust pipe 86 via an inlet pipe 122 mounted about the exhaust pipe 86. An open upper end 124 of the reservoir 120 permits air exhausted from the tubular guide member 20 to escape. Particulate plastic materials entrained by the air flows deposit at the bottom of the reservoir 120, and are returned to the inlet opening 38 through a tube 126 which receives any suction applied in the interior of the bell-shaped housing 36.

It will be appreciated that a particular device has been described to exemplify the principles of operation of the invention and its associated method, and that many modifications may be made in the device described without departing from the scope and spirit of the appended claims.

I claim:

1. A process for removing moisture and other volatiles from a particulate plastic material which is plasticized in a plastic injection molding or extrusion-type machine having a plastic material inlet, a heated barrel and screw, comprising:
    (1) feeding the particulate plastic material to a guide means which extends from said material inlet, wherethrough it flows downward into said material inlet and along said heated barrel;
    (2) applying a suction to said guide means such that a flow of heated air is drawn from apertures in the sidewalls of said guide means substantially through the downwardly flowing particulate plastic material, to a perforated conduit located substantially axially in said guide means and out of said guide means;
    (3) heating and working the particulate plastic material passing along said heated barrel and screw whereby contact with the heated barrel and screw releases volatiles from the plastic material;
    (4) withdrawing said released volatiles by action of said suction through said material inlet, said conduit and out of said guide means in said flow of heated air;
    whereby a flow of said plastic material which is substantially free of moisture and other volatiles is provided to said plastic molding machine for plasticization.

2. A process as claimed in claim 1 wherein the particulate plastic is heated in the guide means to a preselected temperature in the range of about 150° to 200° F.

3. A process as claimed in claim 1 wherein the particulate plastic flows downwardly through the guide means and into the machine inlet under the influence of gravity.

4. A process as claimed in claim 1 wherein the guide means has a sidewall with a multiplicity of generally annular apertures except for weld points which the heated air is drawn inwardly therethrough.

5. A process as claimed in claim 4 wherein the incoming air is pre-heated to a predetermined temperature by electrical heated annular bands adjacent to said annular apertures.

6. A process as claimed in claim 5 wherein the incoming air is collected from the heated air adjacent the heated barrel of the plastic processing machine.

7. A process as claimed in claim 1 wherein the said conduit has an open lower end centrally positioned at the material inlet of the machine.

* * * * *